(12) United States Patent
Marklund et al.

(10) Patent No.: US 11,439,998 B2
(45) Date of Patent: Sep. 13, 2022

(54) METHODS OF TREATING AND SULFIDING HYDROCONVERSION CATALYSTS

(71) Applicant: CHEM32, LLC, Houston, TX (US)

(72) Inventors: Soren Marklund, Houston, TX (US); Douglas G. Wene, Houston, TX (US)

(73) Assignee: CHEM32, LLC, Houston, TX (US)

( * ) Notice: Subject to any disclaimer, the term of this patent is extended or adjusted under 35 U.S.C. 154(b) by 236 days.

(21) Appl. No.: 16/633,990

(22) PCT Filed: Jul. 25, 2018

(86) PCT No.: PCT/US2018/043696
§ 371 (c)(1),
(2) Date: Jan. 24, 2020

(87) PCT Pub. No.: WO2019/023345
PCT Pub. Date: Jan. 31, 2019

(65) Prior Publication Data
US 2020/0215526 A1    Jul. 9, 2020

Related U.S. Application Data

(60) Provisional application No. 62/537,167, filed on Jul. 26, 2017.

(51) Int. Cl.
| | | |
|---|---|---|
| *B01J 38/56* | (2006.01) | |
| *B01J 23/94* | (2006.01) | |
| (Continued) | | |

(52) U.S. Cl.
CPC ............... *B01J 38/56* (2013.01); *B01J 23/94* (2013.01); *B01J 38/10* (2013.01); *B01J 21/04* (2013.01);
(Continued)

(58) Field of Classification Search
None
See application file for complete search history.

(56) References Cited

U.S. PATENT DOCUMENTS

| 6,417,134 B1 | 7/2002 | Dufresne et al. |
|---|---|---|
| 6,509,291 B2 | 1/2003 | Eijsbouts |
| (Continued) | | |

FOREIGN PATENT DOCUMENTS

| CN | 102580757 | 7/2012 |
|---|---|---|
| EP | 0745660 | 12/1996 |
| (Continued) | | |

OTHER PUBLICATIONS

International Search Report and Written Opinion Issued in Corresponding PCT Patent Application No. PCT/US2018/043696, dated Dec. 14, 2018.

(Continued)

*Primary Examiner* — Melissa S Swain
*Assistant Examiner* — Keling Zhang
(74) *Attorney, Agent, or Firm* — Norton Rose Fulbright US LLP

(57) ABSTRACT

Methods of treating hydroconversion catalysts used for cracking of hydrocarbons are described. A method can include mixing an inactive hydroconversion catalyst with a solid hydrocarbon containing material having a melting point of 50° C. or greater. The inactive hydroconversion catalyst/solid hydrocarbon containing material mixture can be contacted with a gaseous stream that includes hydrogen ($H_2$) and a sulfur-containing compound under conditions sufficient to sulfide the catalyst and carbonize at least a portion of the hydrocarbon containing material on the sulfided catalyst to obtain a treated sulfided hydroconversion catalyst.

20 Claims, 1 Drawing Sheet

(51) Int. Cl.
  *B01J 38/10*   (2006.01)
  *B01J 21/04*   (2006.01)
  *B01J 21/06*   (2006.01)
  *B01J 21/08*   (2006.01)
  *C10G 11/04*   (2006.01)

(52) U.S. Cl.
  CPC .............. *B01J 21/063* (2013.01); *B01J 21/08* (2013.01); *C10G 11/04* (2013.01)

(56) References Cited

U.S. PATENT DOCUMENTS

| | | | |
|---|---|---|---|
| 6,559,092 | B1 | 5/2003 | Dufresne et al. |
| 9,272,276 | B2 | 3/2016 | Robinson et al. |
| 2002/0037806 | A1 | 3/2002 | Dufresne et al. |
| 2005/0085378 | A1 | 4/2005 | Birke et al. |

FOREIGN PATENT DOCUMENTS

| | | |
|---|---|---|
| EP | 1607465 | 12/2005 |
| JP | 2014506831 | 3/2014 |

OTHER PUBLICATIONS

Examination Report issued in Corresponding Indian Application No. 202017003529, dated Jul. 4, 2021.
Search Report and Written Opinion Issued in Corresponding Singapore Patent Application No. 11202000663P, dated Jun. 7, 2021.
Extended European Search Report Issued in Corresponding European Patent Application No. 18838055.4, dated Mar. 15, 2021.

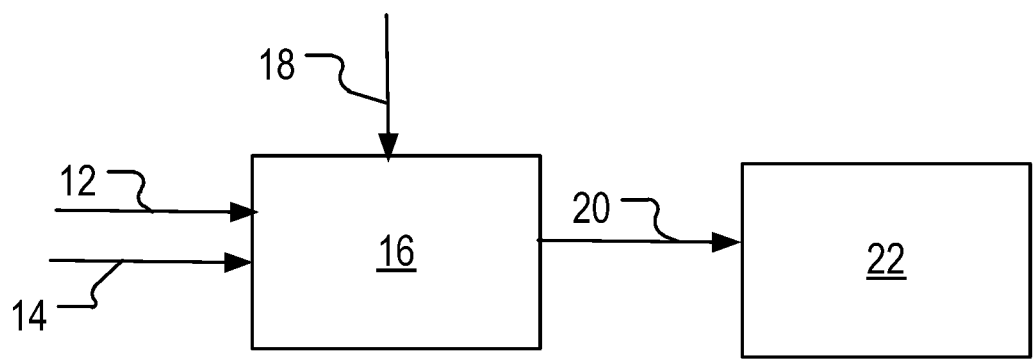

METHODS OF TREATING AND SULFIDING HYDROCONVERSION CATALYSTS

CROSS-REFERENCE TO RELATED APPLICATIONS

This application is a national phase application under 35 U.S.C. § 371 of International Application No. PCT/US2018/043696, filed Jul. 25, 2018, which claims benefit to U.S. Provisional Application No. 62/537,167 titled "METHODS OF PRE-TREATING AND SULFIDING HYDROCONVERSION CATALYSTS", filed Jul. 26, 2017, each of which are incorporated herein by reference in their entirety without disclaimer.

BACKGROUND OF THE INVENTION

A. Field of the Invention

The invention generally concerns methods of treating and sulfiding hydroconversion catalysts.

B. Description of Related Art

Hydroconversion catalysts are used to catalyze reactions that remove impurities from a hydrocarbon feed stream and/or change the chemical structure of the hydrocarbons. Non-limiting examples of such reactions include hydrodesulfurization, hydrodenitrogenation, hydrodemetallization, hydrocracking, dewaxing, hydrogenation, and the like. The catalysts can include a catalytic metal. These catalysts are typically prepared and/or sold with the catalytic metal in its oxidized state, thus requiring that the catalytic metal be activated prior to use. Activation of the catalytic metal can be effected by subjecting the catalyst to a sulfurization step prior to use. The sulfurization step can be carried out in situ or ex-situ. Many of the reactions that use hydroconversion catalysts are performed at elevated temperatures and/or pressures. After activating the catalyst and subsequent immediate introduction of cracked feedstock containing unsaturated hydrocarbons to the catalyst, the high reactivity of the catalyst can cause coke and gums to deposit and diminish catalytic activity and can contribute to pressure drop issues.

Attempts to allow the direct introduction of cracked feedstocks to freshly activated catalyst systems have been described. By way of example, European Patent No. EP0745660 to Osamu et al. describes contacting a catalyst with liquid hydrocarbons under conditions sufficient to form soft coke on the surface of a desulfurizing catalyst before or after sulfiding the catalyst prior and then initiating a hydrodesulfurization reaction with the pretreated catalyst. In another example, U.S. Pat. No. 6,559,092 to Dufresne et al. describes impregnating a high boiling (e.g., 150° C. to 500° C.) liquid carbon-containing compound (e.g., gas oil) in the pores of a hydrotreating catalyst, carbonizing the carbon-containing compound and then sulfurizing the catalyst. In yet another example, U.S. Pat. No. 9,272,276 to Robinson et al. describes a soft coking process that provides a layer of coke to be created on the catalyst surface during or along with in situ sulfiding using a liquid hydrocarbon source and then introducing cracked hydrocarbon feeds to the reactor.

Despite the foregoing, the above-mentioned methods require several steps that add processing time, complications, and costly delays when introducing a cracked feedstock to a catalyst bed.

SUMMARY OF THE INVENTION

A discovery has been made that provides a solution to at least some of the problems associated with the coke and gum formation on hydroconversion catalysts during startup with cracked feedstocks. The solution is premised on methods to combine (e.g., blend) an inactive hydroconversion catalyst with a low melting hydrocarbon solid under conditions that allows the hydrocarbon solid to melt and penetrate the pores of the catalyst. Thus, forming a "coating" or carbonaceous layer on the interior surface of the pores. The inactive hydroconversion catalyst can be an unused catalyst with the catalytic metals being in their metal oxide form that has not been subjected to a sulfiding treatment, or a used catalyst that has been regenerated. The pores of the catalyst can be coated by heating a mixture of the hydrocarbon solid and catalyst and/or heating the catalyst prior to contact with the hydrocarbon solid. The pore-coated catalyst can then be subjected to conditions suitable to sulfurize the active metals in the catalyst and carbonize the hydrocarbon containing material in the pores of the sulfided catalyst to obtain a treated hydroconversion catalyst (e.g., a pre-sulfurized and pre-carbonized catalyst). The method can be performed ex-situ of a hydroconversion unit or in situ in the hydroconversion unit. In addition, the use of a high melting hydrocarbon with an enhanced ability to form a carbonaceous layer, allows for more efficient use of the hydrocarbon.

In one aspect of the present invention, methods for treating a hydroconversion catalyst are described. A method can include (a) mixing an inactive (e.g., unsulfided) hydroconversion catalyst with a solid hydrocarbon containing material having a melting point greater than 50° C.; and (b) contacting the inactive hydroconversion catalyst/solid hydrocarbon containing material mixture with a gaseous stream comprising hydrogen ($H_2$) and a sulfur-containing compound at a temperature sufficient to sulfide and activate the catalyst and carbonize at least a portion of the hydrocarbon containing material on the sulfided catalyst to obtain a carbonized sulfided hydroconversion catalyst.

Mixing step (a) can include contacting the catalyst with at least 1 wt. %, preferably 5 wt. % to 25 wt. %, of the solid hydrocarbon containing material based on the total weight of the catalyst and the material. Non-limiting examples of solid hydrocarbon containing material can include a paraffin wax, a microcrystalline wax, a synthetic wax, an animal wax, a plant wax, or blends thereof. In some embodiments, the catalyst in step (a) is at a temperature lower than the melting point of the solid hydrocarbon containing material at the time the catalyst is contacted with the solid hydrocarbon containing material and sulfiding conditions are sufficient to melt the hydrocarbon containing material and coat the catalyst. This mixture can be heated to a temperature sufficient to melt the hydrocarbon containing material and coat the inactive catalyst. In other embodiments, the catalyst in step (a) is at a temperature higher than the melting point of the solid hydrocarbon containing material at the time the catalyst is contacted with the solid hydrocarbon containing material (e.g., the catalyst is preheated). Mixing of the hot inactive hydroconversion catalyst with the solid hydrocarbon containing material can penetrate the pores of the inactive hydroconversion catalyst. In step (a), the temperature difference between the catalyst and the melting point of the solid hydrocarbon containing material can be 100° C. or less, preferably 10° C. to 90° C., or more preferably 30° C. to 75° C. The melting point of the solid hydrocarbon containing material can be 50° C. to 120° C., preferably 80°

C. to 110° C. In some embodiments, a paraffin wax having a melting point of 50° C. to 70° C., or about 60.5° C. can be used as the solid hydrocarbon containing material. In other embodiments, a paraffin wax having a melting point of 90° C. to 100° C., or about 95° C. can be used as the solid hydrocarbon containing material. Temperatures sufficient to sulfide the catalyst and carbonize at least a portion of the hydrocarbon containing material on the catalyst can range from 175° C. to 500° C. In some embodiments, the pressure is at or below the sulfiding pressure. Sulfiding pressures can range from 90 kPa to 50,000 kPa. In some embodiments, step (a) can be performed at a pressure of 90 kPa to 200 kPa and/or sulfiding step (b) can be performed at a pressure of 90 kPa to 150 kPa. In step (b), the gaseous sulfur-containing compound can be hydrogen sulfide gas ($H_2S$). The gaseous stream in step (b) can include 1% to 10% by volume of the sulfur containing compound, at least 2% by volume of $H_2$, and the remainder being inert gas (e.g., argon, helium, carbon dioxide, nitrogen or the like). In some instances, inert gas is not used. The produced pre-treated hydroconversion catalyst can include 2 wt. % to 12 wt. % carbon resulting from the carbonization (e.g., coking) process, preferably 4 wt. % to 10 wt. % carbon, and/or 2 wt. % to 25 wt. % sulfur (S). The hydroconversion catalyst can include at least one catalytically active transition metal. The catalytic metal can be supported on a metal oxide support (e.g., alumina ($Al_2O_3$), titania ($TiO_2$), or silica ($SiO_2$)), or blends thereof either in amorphous or crystalline state.

The following includes definitions of various terms and phrases used throughout this specification.

The term "cracked feedstock" refers to the feedstock obtained from crude oil that has been subjected to a chemical process to reduce ("crack") the molecular weight. Examples of cracking processes include thermal cracking and catalytic cracking.

The term "inactive" is defined as providing less than 1% conversion in a hydroconversion reaction.

The terms "about" or "approximately" are defined as being close to as understood by one of ordinary skill in the art. In one non-limiting embodiment, the terms are defined to be within 10%, preferably within 5%, more preferably within 1%, and most preferably within 0.5%.

The terms "wt. %", "vol. %", or "mol. %" refers to a weight percentage of a component, a volume percentage of a component, or molar percentage of a component, respectively, based on the total weight, the total volume of material, or total moles, that includes the component. In a non-limiting example, 10 grams of component in 100 grams of the material is 10 wt. % of component.

The term "substantially" and its variations are defined to include ranges within 10%, within 5%, within 1%, or within 0.5%.

The terms "inhibiting" or "reducing" or "preventing" or "avoiding" or any variation of these terms, when used in the claims and/or the specification includes any measurable decrease or complete inhibition to achieve a desired result.

The term "effective," as that term is used in the specification and/or claims, means adequate to accomplish a desired, expected, or intended result.

The use of the words "a" or "an" when used in conjunction with any of the terms "comprising," "including," "containing," or "having" in the claims, or the specification, may mean "one," but it is also consistent with the meaning of "one or more," "at least one," and "one or more than one."

The words "comprising," (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps.

The methods of the present invention can "comprise," "consist essentially of," or "consist of" particular ingredients, components, compositions, etc. disclosed throughout the specification. With respect to the transitional phase "consisting essentially of," in one non-limiting aspect, a basic and novel characteristic of the methods of the present invention are their abilities to pre-treat a hydroconversion catalyst with sulfur and carbon.

BRIEF DESCRIPTION OF THE DRAWINGS

Advantages of the present invention may become apparent to those skilled in the art with the benefit of the following detailed description and upon reference to the accompanying drawings.

FIG. 1 is a schematic a method of the present invention to pre-treat a hydroconversion catalyst.

While the invention is susceptible to various modifications and alternative forms, specific embodiments thereof are shown by way of example in the drawings. The drawings may not be to scale.

DETAILED DESCRIPTION OF THE INVENTION

A discovery has been made that provides a possible solution to the premature deactivation of hydroconversion catalysts in cases when cracked feedstocks are introduced earlier than the recommended seventy-two hour "seasoning" period customarily used by refineries. The solution is premised on providing a hydrocarbon containing material to the pores of an inactive hydroconversion catalyst prior to sulfiding the catalyst and subsequent carbonization of the catalyst. This can be performed by combining or blending a solid hydrocarbon containing material with the catalyst and heating the mixture above the melting point of the hydrocarbon containing material. In other instances, the catalyst can be heated to a temperature above the melting point of the hydrocarbon containing material and the hot catalyst melts the hydrocarbon containing material such that it penetrates the pores of the catalyst. The coated catalyst can be subjected to conditions sufficient to sulfide the catalyst with subsequent carbonization of the hydrocarbon containing material. The methods of the present invention to pre-treat a hydroconversion catalyst provide an elegant way to inhibit excessive coke formation on the catalyst caused by local exotherms on the catalyst surface when exposed to cracked feedstocks. Without wishing to be bound by theory, it is believed that sulfurizing the active metals and then carbonizing a hydrocarbon containing material in the pores of the catalyst can result in a catalyst having high activity while maintaining selectivity towards hydrocracking and/or hydrotreating and at the same time limiting hydrogenation activity of the catalyst. The methods of the present invention provide an elegant way to pre-treat a catalyst without having to subject the catalyst to a liquid hydrocarbon impregnation step prior to carbonizing and sulfiding. The method can be performed ex-situ of a hydroconversion unit or in situ in the hydroconversion unit. In addition, the use of a high melting hydrocarbon with an enhanced ability to form coke, allows for more efficient use of the hydrocarbon. Thus, the method provides an elegant alternative and more efficient process than the current commercial processes.

These and other non-limiting aspects of the present invention are discussed in further detail in the following sections with reference to FIG. 1.

A. Materials

The inactive hydroconversion catalyst can be an unused catalyst with the catalytic metals being in their metal oxide form that has not been subjected to a sulfiding treatment, or a used catalyst that has been regenerated. The inactive hydroconversion catalysts of the present invention can be made using known catalyst preparation methods (e.g., impregnation, co-precipitation, precipitation, grafting and the like) or obtained from commercial sources. Inactive hydroconversion catalysts include at least one catalytic transition metal or an oxide thereof. In some embodiments, the inactive catalyst includes two or more transition metals. The inactive hydroconversion catalyst can include an alkali metal, an alkaline earth metal, post transition metals, and promoters such as phosphorous and/or boron. Transition metals include metals from Columns 3-12 of the Periodic Table. Non-limiting examples of transition metals include vanadium, chromium, molybdenum, tungsten, manganese, rhenium, iron, ruthenium, cobalt, nickel, palladium, platinum, copper, silver, gold, zinc, and cadmium or combinations thereof. Non-limiting examples of alkali metals include lithium, sodium, potassium, rubidium and cesium or combinations thereof. Non-limiting examples of alkaline earth metals include magnesium, calcium, and barium. The inactive catalyst can include a support. In some embodiments, the support can be a metal oxide. Non-limiting examples of metal oxide supports include alumina ($Al_2O_3$), titania ($TiO_2$), silica ($SiO_2$), or combinations thereof. In some embodiments, the catalyst is nickel catalyst, a molybdenum catalyst, a nickel/molybdenum catalyst, a cobalt/molybdenum catalyst, a nickel/tungsten catalyst or the like.

The hydrocarbon containing material used in the methods of the present invention can be any material that has a melting point of 50° C. or greater such that the hydrocarbon containing material has a sufficiently low viscosity to enable penetration and coating of the catalyst pores. In some embodiments, the hydrocarbon containing material, after melting, can have a viscosity of 2 to 1000 cSt or preferably about 3 to 200 cSt or greater than, equal to, or between any two of 2, 10, 50, 75, 100, 150, 200, 250, 300, 350, 400, 450, 500, 550, 600, 650, 700, 750, 800, 850, 900, 950, and 1000 cSt. The hydrocarbon containing material can have a melting point of 50° C. to 150° C., or greater than, equal to or between any two of: 50, 55, 60, 65, 70, 75, 80, 85, 90, 95, 100, 105, 110, 115, 120, 125, 130, 135, 140, 145, and 150° C. In some embodiments, the hydrocarbon containing material can be a wax. Waxes can include petroleum-based waxes, plant waxes, and animal waxes. Non-limiting examples of petroleum based waxes include a paraffin wax, a microcrystalline wax, a synthetic wax, Fischer-Tropsch wax (e.g., a wax from a Fischer-Tropsch process), an alpha olefin wax (e.g., a wax synthetically derived from ethylene via a Ziegler-Natta catalyst), a Montan wax, peat wax, an ozokerite wax, a ceresin wax and blends thereof. Non-limiting examples of animal or insect waxes include beeswax, lanolin, stearin, ambergris, tallow and blends thereof. Non-limiting examples of plant waxes include carnauba wax, candelilla wax, vegetable-based waxes of sufficiently low viscosity when molten to allow for coating of the catalyst (e.g., soy wax, Japan wax, and the like). In a preferred embodiment, the hydrocarbon containing material is a paraffinic wax having a melting point of 50 to 120° C., or 50° C. to 70° C., or 90° C. to 120° C., or greater than, equal to, or between any two of 50, 55, 60, 65, 70, 75, 80, 85, 90, 95, 100, 105, 110, 115 and 120° C. In some embodiments, the paraffinic wax has a melting point of about 60.5° C. In another embodiment, the paraffinic wax has a melting point of about 95° C.

Sulfur containing compounds can include any compound capable of providing a sulfur atom to the catalytic metal. Non-limiting examples of sulfur containing compounds include hydrogen sulfide, elemental sulfur, dimethyl disulfide, di-t-butyl polysulfide, n-butyl mercaptan, tertiary nonyl polysulfide or combinations thereof. In some embodiments, the sulfur-containing compound is hydrogen sulfide. Sulfur containing compounds can be obtained through various commercial sources or from a refining process.

B. Method of Pre-Treating a Hydroconversion Catalyst

FIG. 1 is a schematic of the method of the present invention to pre-treat a hydroconversion catalyst. In method 10, inactive hydroconversion catalyst 12 can be combined with solid hydrocarbon containing material 14 having a melting point of 50° C. or greater in treating unit 16. Any inactive hydroconversion catalyst can be used (e.g., the hydroconversion catalysts described in Section A above). Combining (or blending) of the inactive hydroconversion catalyst 12 can be performed by adding the inactive hydroconversion catalyst and the appropriate hydrocarbon containing material 14 to treating unit 16. Treating unit 16 can be a fixed bed reactor, a packed bed reactor, or a fluidized bed reactor. The inactive catalyst 12, or the hydrocarbon containing material 14, or mixtures thereof (a mixture of inactive hydroconversion catalyst 12 and the hydrocarbon containing material 14) can be heated to a temperature from 60° C. to 200° C., or 80° C. to 150° C. or a temperature greater than, equal to, or between any two of 60° C., 65° C., 70° C., 75° C., 80° C., 85° C., 90° C., 95° C., 100° C., 105° C., 110° C., 115° C., 120° C., 125° C., 130° C., 135° C., 140° C., 145° C., 150° C., 155° C., 160° C., 165° C., 170° C., 175° C., 180° C., 185° C., 190° C., 195° C., and 200° C. The temperature difference between the catalyst and the melting point of the solid hydrocarbon containing material can be 100° C. or less, preferably 10° C. to 90° C., or more preferably 30° C. to 75° C., or less than, equal to, or between any two of 100° C., 90° C., 80° C., 70° C., 60° C., 50° C., 40° C., 30° C., 20° C., and 10° C. By way of example, the mixture of inactive hydroconversion catalyst 12 and the hydrocarbon containing material 14 can be heated to 110° C. when a paraffinic wax having a melting point of 95° C. is used, or to 75° C. when a paraffinic wax having a melting point of about 65° C. is used. In another instance, inactive hydroconversion catalyst 12 can be heated to a temperature higher than the melting point of hydrocarbon containing material 14 and then added to pre-treating unit 16. At these temperatures, hydrocarbon containing material 14 melts and/or vaporizes and contacts the pores of the inactive catalyst 12. In a preferred instance, hydrocarbon containing material 14 and inactive catalyst 12 are both heated using hot sulfiding gases, such that hydrocarbon material 14 melts and penetrates the pores of the inactive catalyst. The heating can be performed simultaneously. Contact of the hot hydroconversion catalyst 12 with hydrocarbon containing material 14 can melt or vaporize the hydrocarbon containing material, coating the surface of the catalyst's pores. In some embodiments, no heat is applied to the catalyst or the mixture prior to sulfurization. In all cases, as the hot hydrocarbon containing material melts, it penetrates the pores of the catalyst and coats the surface or a portion of the surface of pores of the catalyst with the hydrocarbon containing material, but is not carbonized.

Once or while the catalyst is coated with the hydrocarbon containing material, a gaseous sulfiding stream can enter treating unit 16, and the temperature can be raised to temperatures suitable for sulfiding and carbonization. Referring to FIG. 1, gaseous stream 18 can be introduced to treating unit 16. Gaseous stream 18 can include hydrogen ($H_2$), a sulfur-containing compound described in Section A above (e.g., $H_2S$) and optionally inert gas. Gaseous stream 18 can include 1% to 10% by volume of the sulfur containing compound, more than 0.5% by volume of $H_2$, and, optionally, the reminder being inert gas. In some embodiments, gaseous stream 18 can include a volume percentage of a sulfur containing compound that is greater than, equal to, or between any two of 1, 2, 3, 4, 5, 6, 7, 8, 9, and 10%. The volume percentage of $H_2$ in gaseous stream 18 can be greater than, equal to, or between any two of 0.5 1, 5, 10, 15, 20, 25, 30, 35, 40, 45, 50, 60, 65, 70, 75, 80, 85, 90, 95, 99 vol. %. The balance of the gaseous stream can be inert gas (e.g., helium, argon, nitrogen, and the like). For example, the gaseous stream can include 0 to 93 vol. % inert gas or at least, equal to, or between any two of 40, 45, 50, 55, 60, 65, 70, 75, 80, 85, 90 and 93 volume %. The amount of sulfiding agent and hydrogen can be determined depending on the catalytic metals and/or the use of the hydroconversion catalyst.

The mixture of coated catalyst can be heated in the presence of gaseous stream 18 for a time sufficient to sulfide and carbonize the inactive catalyst to form a treated sulfided hydroconversion catalyst. In some embodiments, the temperature can be 175° C. to 500° C. or at greater than, equal to, or between any two of 175, 180, 185, 190, 195, 200, 205, 210, 225, 250, 275, 300, 325, 350, 375, 400, 425, 450, 475, and 500° C. Contact of the inactive catalyst at the sulfiding/carbonization temperatures converts the catalytic metal oxide to a metal sulfide and carbonizes the hydrocarbon containing material on the surface of the catalyst or in the lattice of the catalyst support and produces a treated sulfided hydroconversion catalyst. In some embodiments, the mixture can be heated in a two-step process. In the first heating step, the mixture can be heated to a temperature of 150 to 250° C., or 175 to 225° C., or at a temperature greater than, equal to, or between any two of 150, 175, 200, 225, and 250° C. for a desired amount of time (e.g., 1 to 6 hours or 1, 2, 3, 4, 5, 6 hours). In the second heating step, the mixture can be heated to 310° C. to 400° C., or 320 to 350° C., or at a temperature greater than, equal to, or between any two of 310° C., 325° C., 375° C., and 400° C. for a desired amount of time (e.g., 1 to 6 hours or 1, 2, 3, 4, 5, 6 hours). In the two-step heating process, without wishing to be bound by theory, it is believed that the sulfurization begins at the lower temperature and carbonization and completed sulfurization occurs at the higher temperature. Without wishing to be bound by theory, it is believed that sulfiding the catalyst makes the catalytic metal more "active" towards nitrogen compounds, sulfur containing compounds, metal compounds, hydrocarbons, aromatics in a hydrocarbon feed stream. Deposition of carbon material in the pores of the catalyst during and after sulfiding can enhance the activity of the catalyst. This active catalyst can be directly used in a hydroconversion reaction.

The contacting and/or sulfiding can be done at the same or different pressures. Blending of the catalyst with the hydrocarbon containing material can be performed at partial pressures of 90 kPa to 50000 kPa, or at greater than, equal to, or between any two of, 90, 95, 100, 105, 110, 115, 120, 130, 135, 140, 145, 150, 155, 160, 165, 170, 175, 180, 185, 190, 195, 200, 300, 400, 500, 600, 1000, 5000, 10,000, 20,000, 30000, 40000, 50000 kPa or higher. Sulfiding and carbonization can be performed at 90 kPa to 150 kPa, 100 to 140 kPa, or at greater than, equal to, or between any two of 90, 95, 100, 105, 110, 115, 120, 130, 135, 140, 145, 150, and 155 160, 165, 170, 175, 180, 185, 190, 195, 200, 300, 400, 500, 600, 1000, 5000, 10,000, 20,000, 30000, 40000, 50000 kPa or higher.

The produced treated sulfided hydroconversion catalyst can include 2 wt. % to 15 wt. % carbon generated from the heating process, preferably 4 wt. % to 7 wt. % carbon generated from the heating process, or greater than, equal to, or between any two of 2, 3, 4, 5, 6, 7, 8, 9, 10, 11, 12, 13, 14, and 15 wt. %. The produced treated sulfided hydroconversion catalyst can include 2 wt. % to 25 wt. % sulfur, preferably 3 wt. % to 15 wt. % sulfur generated from the heating process, or greater than, equal to, or between any two of 2, 3, 4, 5, 6, 7, 8, 9, 10, 11, 12, 13, 14, 15, 16, 17, 18, 19, 20, 21, 22, 23, 24 and 25 wt. %. Referring to FIG. 1, treated sulfided hydroconversion catalyst 20 can exit mixing unit 16 and be collected in collection unit 22. Treated sulfided hydroconversion catalyst 20 can be sold or transported to a hydroconversion unit. In some embodiments, treated sulfided hydroconversion catalyst 20 can be used directly in the hydroconversion reactor. Non-limiting examples of hydroconversion units include hydrocracking units and hydrotreating units. Hydrotreating units can reduce sulfur, nitrogen and aromatic content of a hydrocarbon material (e.g. a hydrocarbon stream from a refining process). Non-limiting examples of hydroconversion units include hydrocracking units and hydrotreating units. Hydrotreating units can reduce sulfur, nitrogen and aromatic content of a hydrocarbon material (e.g., a hydrocarbon stream from a refining process). Hydrocracking units can reduce the molecular weight of a hydrocarbon material.

EXAMPLES

The present invention will be described in greater detail by way of specific examples. The following examples are offered for illustrative purposes only, and are not intended to limit the invention in any manner. Those of skill in the art will readily recognize a variety of noncritical parameters, which can be changed or modified to yield essentially the same results.

Comparative Example

A hydrotreating catalyst containing molybdenum oxide (22.0% by weight) and nickel oxide (4.5% by weight) deposited on a gamma-alumina support was sulfurized at atmospheric pressure with a mixture containing 5% hydrogen sulfide, 4% hydrogen and 91% nitrogen by volume in two steps, initially at a temperature ranging from 175° C. to 225° C. followed by a final step at a temperature ranging from 320° C. to 350° C., each sulfiding step lasted 4 hours. The catalyst was then allowed to cool to ambient temperature in the presence of nitrogen and it was analyzed for the degree of sulfurization as well as carbon content indicating the level of coke formation. Table 1 lists the percentage of carbon (% C) and degree of sulfurization prior to and after sulfiding.

TABLE 1

| Catalyst | % C | Degree of sulfurization |
|---|---|---|
| Prior to sulfiding | 0.2 | 0% |
| After sulfiding | 0.2 | 98% |

Example 1

Method of the Present Invention to Treat a Hydroconversion Catalyst

The catalyst used in Comparative Example 1 was heated to 75° C. and mixed with 10% of a fully refined commercial paraffin wax with a melting point of 64.5° C. and an oil content of 0.45%. The catalyst was then sulfurized at atmospheric pressure with a mixture containing 5% hydrogen sulfide, 4% hydrogen and 91% nitrogen by volume in two steps, initially at a temperature ranging from 175° C. to 225° C. followed by a final step at 320° C. to 350° C., each sulfiding step lasted 4 hours. The catalyst was then allowed to cool to ambient temperature in the presence of nitrogen and it was analyzed for the degree of sulfurization as well as carbon content indicating the level of coke formation. Prior to the carbon analysis, the catalyst was rinsed from any unreacted paraffin by leaching with n-hexane under reflux. Table 2 lists the percentage of carbon (% C) and degree of sulfurization prior to and after sulfiding.

TABLE 2

| Catalyst | % C | Degree of sulfurization |
|---|---|---|
| Prior to sulfiding | 0.2 | 0% |
| After sulfiding | 4.6 | 98% |

Example 2

Method of the Present Invention to Treat a Hydroconversion Catalyst

The catalyst used in Comparative Example 1 was heated to 110° C. and mixed with 10% of a fully refined commercial paraffin wax with a melting point of 95° C. and an oil content of 0.2%. The catalyst was then sulfurized at atmospheric pressure with a mixture containing 5% hydrogen sulfide, 4% hydrogen and 91% nitrogen by volume in two steps, initially at a temperature ranging from 175° C. to 225° C. followed by a final step at 320° C. to 350° C., each sulfiding step lasted 4 hours. The catalyst was then allowed to cool to ambient temperature in the presence of nitrogen and it was analyzed for the degree of sulfurization as well as carbon content indicating the level of coke formation. Prior to the carbon analysis, the catalyst was rinsed from any unreacted paraffin by leaching with n-hexane under reflux. Table 3 lists the percentage of sulfur (% S) and carbon (% C), and degree of sulfurization prior to and after sulfiding.

TABLE 3

| Catalyst | % S | % C | Degree of sulfurization |
|---|---|---|---|
| Prior to sulfiding | 0.0 | 0.2 | 0% |
| After sulfiding | 10.4 | 5.9 | 98% |

The invention claimed is:

1. A method of treating a hydroconversion catalyst, the method comprising:
   (a) combining an inactive hydroconversion catalyst with a solid hydrocarbon containing material having a melting point of 50° C. or greater to produce an unsulfided hydroconversion catalyst/solid hydrocarbon containing material mixture; and
   (b) sulfiding the inactive hydroconversion catalyst by contacting the unsulfided hydroconversion catalyst/solid hydrocarbon containing material mixture with a gaseous stream comprising hydrogen ($H_2$) and a sulfur containing compound at a temperature sufficient to sulfide the inactive hydroconversion catalyst and carbonize at least a portion of the hydrocarbon containing material on the sulfided inactive hydroconversion catalyst to obtain a treated sulfided hydroconversion catalyst.

2. The method of claim 1, wherein the inactive hydroconversion catalyst in step (a) is at a temperature lower than the melting point of the solid hydrocarbon containing material at the time the inactive hydroconversion catalyst is contacted with the solid hydrocarbon containing material.

3. The method of claim 2, further comprising heating the mixture to a temperature sufficient to melt the solid hydrocarbon containing material.

4. The method of claim 3, wherein the melted hydrocarbon containing material coats the surface of the pores of the unsulfided inactive hydroconversion catalyst.

5. The method of claim 2, wherein a temperature difference between the inactive hydroconversion catalyst and the melting point of the solid hydrocarbon containing material is 10° C. to 90° C.

6. The method of claim 1, wherein the inactive hydroconversion catalyst in step (a) is at a temperature greater than the melting point of the solid hydrocarbon containing material at the time the inactive hydroconversion catalyst is contacted with the solid hydrocarbon containing material.

7. The method of claim 1, wherein the melting point of the solid hydrocarbon containing material is 50° C. to 150° C.

8. The method of claim 1, wherein the solid hydrocarbon containing material is a paraffin wax, a microcrystalline wax, a synthetic wax, an animal wax, a plant wax or blends thereof.

9. The method of claim 8, wherein the paraffin wax has a melting point of 60° C. to 100° C.

10. The method of claim 1, wherein mixing step (a) comprises contacting the inactive hydroconversion catalyst with 5 wt. % to 25 wt. % of the solid hydrocarbon containing material based on the total weight of the inactive hydroconversion catalyst and the solid hydrocarbon containing material.

11. The method of claim 1, wherein the temperature sufficient to sulfide the catalyst and carbonize at least a portion of the hydrocarbon containing material on the inactive hydroconversion catalyst is 175° C. to 500° C.

12. The method of claim 1, wherein the gaseous sulfur containing compound is hydrogen sulfide gas ($H_2S$).

13. The method of claim 1, wherein the gaseous stream comprises 1% to 10% by volume of the sulfur containing compound, and at least 0.5% by volume of $H_2$.

14. The method of claim 1, wherein the produced treated sulfided hydroconversion catalyst comprises 2 wt. % to 15 wt. % carbon produced from the carbonization.

15. The method of claim 1, wherein the produced treated sulfided hydroconversion catalyst comprises 2 wt. % to 25 wt. % sulfur.

16. The method of claim 1, wherein the inactive hydroconversion catalyst comprises at least one catalytically active transition metal or oxide thereof.

17. The method of claim 16, wherein the catalytic metal is supported on a metal oxide support.

18. The method of claim 17, wherein the catalytic metal is supported on alumina ($Al_2O_3$), titania ($TiO_2$), or silica ($SiO_2$).

19. The method of claim 1, wherein step (a) and step (b) are performed ex-situ of a hydroconversion processing unit.

20. The method of claim 1, wherein step (a) and step (b) are performed in-situ in a hydroconversion processing unit.

* * * * *